US008907794B2

(12) United States Patent
Estevez et al.

(10) Patent No.: US 8,907,794 B2
(45) Date of Patent: Dec. 9, 2014

(54) CRYPTOGRAPHIC LOCK, METHOD OF OPERATION THEREOF AND SECURE CONTAINER EMPLOYING THE SAME

(75) Inventors: Leonardo W. Estevez, Rowlett, TX (US); Johnsy Varghese, The Colony, TX (US); Steven C. Lazar, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 674 days.

(21) Appl. No.: 12/130,315

(22) Filed: May 30, 2008

(65) Prior Publication Data

US 2009/0322531 A1 Dec. 31, 2009

(51) Int. Cl.

| | |
|---|---|
| ***G08B 13/14*** | (2006.01) |
| ***B60Q 1/00*** | (2006.01) |
| ***G08B 1/08*** | (2006.01) |
| ***G08B 17/00*** | (2006.01) |
| ***G08B 13/24*** | (2006.01) |
| ***G08B 23/00*** | (2006.01) |
| ***E05B 65/00*** | (2006.01) |
| ***H04L 9/00*** | (2006.01) |
| ***G07C 9/00*** | (2006.01) |
| ***E05B 47/00*** | (2006.01) |

(52) U.S. Cl.

CPC ........ *G07C 9/00896* (2013.01); *G07C 2209/08* (2013.01); *E05B 47/0009* (2013.01)

USPC ................ 340/572.1; 340/425.5; 340/539.13; 340/585; 340/571; 340/551; 340/572.3; 70/57.1; 380/46

(58) Field of Classification Search

USPC ........... 340/572.1, 572.8, 572.9, 870.01, 531, 340/693.9, 539.12, 539.13, 539.26, 572.4; 702/56, 33, 185, 188; 604/20, 65, 66, 604/67, 890.1, 892, 892.1

See application file for complete search history.

(56) References Cited

U.S. PATENT DOCUMENTS

| | | | | |
|---|---|---|---|---|
| 4,837,822 | A * | 6/1989 | Crosley et al. | 713/185 |
| 5,905,446 | A * | 5/1999 | Benore et al. | 340/5.7 |
| 6,272,857 | B1 * | 8/2001 | Varma | 60/527 |
| 6,646,555 | B1 * | 11/2003 | Forster et al. | 340/572.8 |
| 7,215,250 | B2 * | 5/2007 | Hansen et al. | 340/572.9 |
| 2005/0232747 | A1 * | 10/2005 | Brackmann et al. | 414/803 |
| 2008/0103660 | A1 * | 5/2008 | Browne et al. | 701/46 |
| 2010/0144269 | A1 * | 6/2010 | Do et al. | 455/41.1 |

* cited by examiner

*Primary Examiner* — Jennifer Mehmood

*Assistant Examiner* — Mirza Alam

(74) *Attorney, Agent, or Firm* — Alan A. R. Cooper; Frederick J. Telecky, Jr.

(57) ABSTRACT

Various cryptographic locks for securing assets, secure containers and methods of operating a cryptographic lock. One embodiment of a cryptographic lock includes: (1) a shape memory alloy (SMA) having a first and second phase, wherein the first phase inhibits access to an asset and the second phase allows access to the asset and (2) an RFID transponder, coupled to the SMA, configured to receive an authentication signal from an RFID transceiver and, based thereon, energize the SMA to temporarily change the SMA from the first phase to the second phase.

16 Claims, 2 Drawing Sheets

CRYPTOGRAPHIC LOCK, METHOD OF OPERATION THEREOF AND SECURE CONTAINER EMPLOYING THE SAME

TECHNICAL FIELD OF THE INVENTION

The invention is directed, in general, to securing property and, more specifically, to a cryptographic lock, a method of operating a cryptographic lock and a secure container employing a cryptographic lock.

BACKGROUND OF THE INVENTION

Locks are used to prevent unauthorized disclosure or use of property. The types of locks used can vary depending on the property to be protected. For example, various locks are used to protect property ranging from homes to containers of all sizes.

Though locks may take many different forms, most locks are mechanical or electromechanical. A key, appropriate to one or a group of locks, is typically used to open the lock. Depending upon the type of lock, the key may be a physical structure or a combination of numbers, such as a sequence or authentication code. Thus, while locks may limit unauthorized access to property, locks also limit authorized access to property by requiring a user to have an appropriate key for the lock. Authorized users, therefore, must keep the appropriate type of key to open each particular lock.

In addition to requiring a user to keep track of a key, conventional locks are not feasible for smaller objects where controlling access is also beneficial. Folders, and even medicine bottles, are examples of containers where using conventional locks would be cumbersome. Accordingly, improved locks that can be used for multiple objects, even small containers, and reduce the nuisance of carrying a key or memorizing a code are needed in the art.

SUMMARY OF THE DISCLOSURE

To address the above-discussed deficiencies of the prior art, the disclosure provides a cryptographic lock for securing an asset. In one embodiment, the cryptographic lock includes: (1) a shape memory alloy (SMA) having a first and second phase, wherein the first phase inhibits access to an asset and the second phase allows access to the asset and (2) a radio-frequency identification (RFID) transponder, coupled to the SMA, configured to receive an authentication signal from an RFID transceiver and, based thereon, energize the SMA to temporarily change the SMA from the first phase to the second phase.

In another aspect, the disclosure provides a method of operating a cryptographic lock having at least one SMA. In one embodiment, the method includes: (1) receiving a first RF signal, (2) determining the first RF signal includes a first designated key and (3) energizing, if the first radio frequency (RF) signal includes the first designated key, a first SMA to change the first SMA from a first phase to a second phase, the first phase inhibiting access to an asset and the second phase allowing access to the asset.

In yet another aspect, the disclosure provides a secure container. In one embodiment, the secure container includes: (1) a body having a cavity, (2) a lid configured to engage the body and cover at least a portion of the cavity and (3) a cryptographic lock associated with one of the body and the lid. The cryptographic lock includes: (3A) an SMA capable of assuming an Austenite phase and a Martensite phase, one of the Austenite phase and the Martensite phase being a first phase and another of the Austenite phase and the Martensite phase being a second phase, the first phase inhibiting the lid from uncovering the cavity, the second phase allowing the lid to be displaced to uncover the cavity and (3B) an RFID transponder, coupled to the SMA, configured to receive an authentication signal from an RFID transceiver and, based thereon, energize the SMA and thereby temporarily cause the SMA to change from the first phase to the second phase.

In still another aspect, the disclosure provides another cryptographic lock. One embodiment of this cryptographic lock includes a first latch configured to inhibit access to an asset when in a locked position and allow access to the asset when in an unlocked position, wherein the first latch is configured to temporarily change from the locked position to the unlocked position in response to receipt of an RF signal at a first frequency.

BRIEF DESCRIPTION OF THE DRAWINGS

For a more complete understanding of the invention, reference is now made to the following descriptions taken in conjunction with the accompanying drawings, in which.

DETAILED DESCRIPTION

The present disclosure provides a cryptographic lock that uses an RF transceiver to provide the key to allow access to assets. In one embodiment, the cryptographic lock includes at least one SMA circuit integrated with an RFID transponder. Energy generated by the RFID transponder causes a change between Martensite and Austenite phases of the SMA to unlock the cryptographic locks and allow access to assets. The RFID transponder generates the energy upon receipt of an authentication signal from an RFID transceiver which, for example, may be integrated within a mobile telephone.

Multiple SMA circuits may be used to inhibit access to an access. As such, a different frequency may be employed to provide the appropriate signal for energizing each of the SMA circuits to change from one phase to another phase. Thus, a combination lock may be used that requires multiple frequencies to unlock. In some embodiments, instead of an SMA circuit, a solenoid may be used. In embodiments with multiple solenoids, each of the solenoids can operate at a different frequency to move the corresponding cores of the solenoids from a locked position to an unlocked position to allow access.

The cryptographic lock disclosed herein does not require a user to remember a code or carry a key. Instead, a user can use an RF transceiver to transmit a signal including key to operate the lock. A cellular telephone can be used as the RF transceiver. Additionally, unlike alternative locks which are typically larger, the cryptographic lock can be positioned out of view but still function. As such, the cryptographic lock can be used to discretely secure assets.

In addition to preventing access, the cryptographic lock can also be used to monitor access to an asset. A log can be used to track when the lock has been opened. Thus, a user can review the log, such as via a mobile telephone, and determine at what times the lock was opened. These times can then be compared to known times of access by the user to determine if any unauthorized assess occurred.

The disclosed cryptographic lock can be used to secure various assets. Additionally, the cryptographic lock can be used on various structure or containers to secure the assets. For example, the cryptographic lock disclosed herein may be used to secure folders, laptops, suitcases, vehicles, cabinets, firearms or containers. The containers using the locks can vary in size and be used to store a wide ranging of products including medicine, alcohol, hazardous substances, etc. The cryptographic lock, therefore, can be used in multiple embodiments. Considering a medicine container, a log can be reviewed to indicate, for example, when a user has taken medication. Thus, the disclosed cryptographic lock can be used to monitor medication for a patient. The cryptographic lock may be integrated with an object or may be added to an object after manufacturing.

Figure 1:
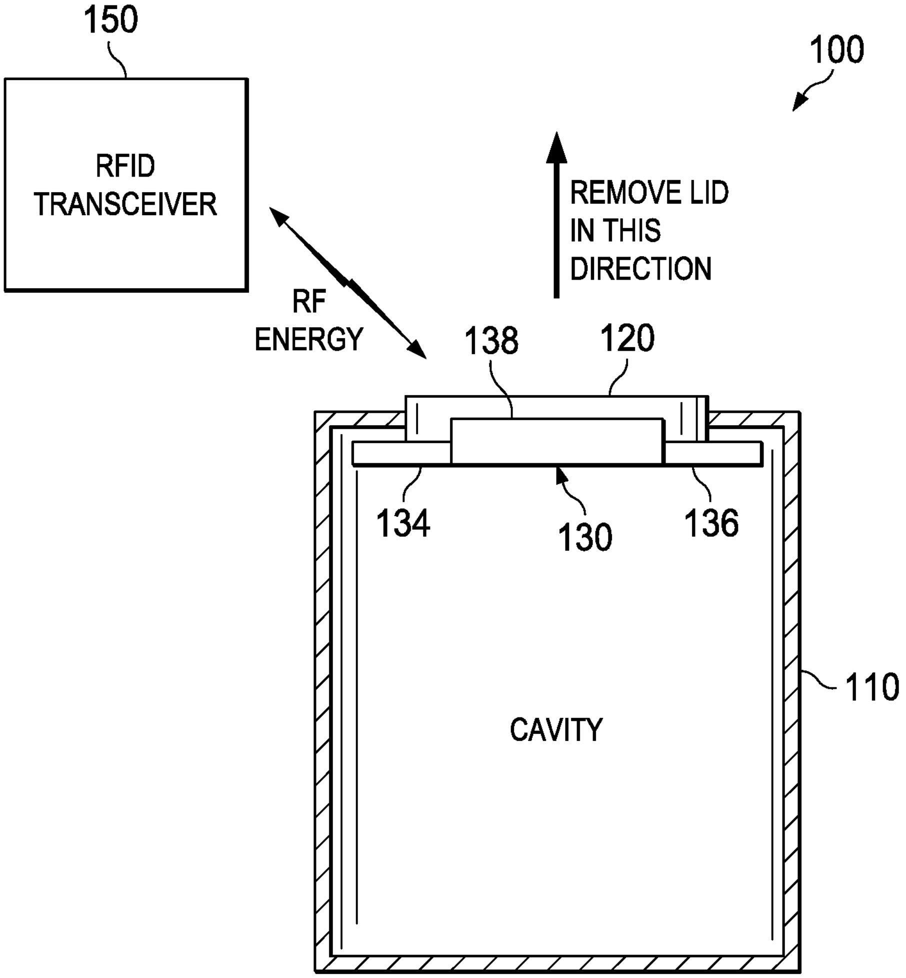
FIG. 1 is an illustration of a side view of an embodiment of a secure container constructed according to the principles of the present disclosure.

FIG. 1 illustrates a side view of an embodiment of a secure container 100 constructed according to the principles of the present disclosure. The secure container 100 includes a body 110, a lid 120 and a cryptographic lock 130. The secure container 100 is configured to store assets in the cavity. For example, the secure container 100 may be a medicine container for storing medicine. Of course, the secure container 100 is not limited to being a medicine container but may be used to store other products.

The body 110 has a cavity wherein various products or assets may be stored. The lid 120 is configured to engage the body and cover at least a portion of the cavity. Thus, depending on the embodiment, the size of the body 110, the corresponding cavity and the lid 120 can vary. In some embodiments, the lid 120 may be sized to cover the entire opening of the cavity. The lid 120 is removed from the body 110 by being pulled away in an upward direction as illustrated. In other embodiments, the lid 120 and the body 110 may be coupled together via a different means. For example, the lid 120 and the body 110 may have corresponding threads or grooves that allow the lid 120 to be threadedly engaged with the body 110, allowing the lid 120 to be screwed on or screwed off the body 110. The body 110 or lid 120 may be constructed of various materials including, plastics, metals, woods, etc.

The cryptographic lock 130 can be associated with one of the body 110 and the lid 120 and is configured to control access to the cavity of the secure container 100. The cryptographic lock 130 includes a first SMA 134, a second SMA 136 and an RFID transponder 138. The SMAs 134, 136, are capable of assuming an Austenite phase and a Martensite phase. Those skilled in the pertinent art are familiar with SMAs, their Austenite and Martensite phases and how they may be transitioned between the phases using an electric current. In the cryptographic lock 130, the SMAs 134, 136, are configured to inhibit removing the lid 120 while in the Martensite phase to uncover the cavity. When in the Austenite phase, the SMAs 134, 136, are configured to allow the lid 120 to be displaced to uncover the cavity.

In other embodiments, a single SMA may be used to inhibit or allow access to the cavity. Additionally, the SMA may be positioned differently to prevent access to the cavity. For example, in the secure container 100, the top portion (both sides) of the body 110 provides a barrier to remove the lid 120 when the SMAs are in the Martensite phase. In another embodiment of a secure container, such as one with a twist cap, the SMA or SMAs may extend perpendicularly from a lid while in the Martensite phase and cooperate with a ridge of the body to inhibit access (i.e., prevent the lid from being twisted-off). Of course, the cryptographic lock 130 may also be integrated with the body 110 instead of the lid 120. As such, the SMA of SMAs integrated with the body 110 would cooperate with a barrier or barriers located on the lid 120 to inhibit access to the cavity.

The RFID transponder 138 is coupled to the SMAs 134, 136, and is configured to receive an authentication signal from an RFID transceiver 150 and, based thereon, energize the SMAs 134, 136. The energy from the RFID transponder 138 temporarily causes the SMAs 134, 136, to change from a first phase to a second phase. The RFID transponder 138 provides current to the to SMAs 134, 136, to energize each SMA and, through the heat generated by the current, transform the SMAs 134, 136, from the Martensite phase and to the Austenite phase. The energy heats the SMAs 134, 136, to a threshold temperature ($A_s$) that is needed to change the SMAs 134, 136, from the Martensite phase to the Austenite phase. The temperature at the completion of the transformation to the Austenite phase is referred to as $A_f$. The threshold and final temperatures of the SMA depend on the material of the SMAs 134, 136. The SMAs 134, 136, may be, for example, copper-zinc-aluminum-nickel, copper-aluminum-nickel, or nickel-titanium (NiTi) alloys.

The RFID transponder 138 and the RFID transceiver 150 may be conventional devices. The RFID transponder 138 can be a conventional RFID transponder that is activated upon receipt of a coded signal (i.e., the authentication signal) from a corresponding RFID transceiver (i.e., the RFID transceiver 150). The RFID transponder 138 may be a passive device that derives power from the received RF signal from the RF transceiver 150. In other embodiments, the RF transponder 138 may be a battery-powered device. The RFID transponder 138 may be RFID tag including a microchip combined with an antenna. The antenna receives a signal from an RFID reader or scanner, such as the authentication signal from the RFID transceiver 150, and returns the signal. The return signal to the RFID transceiver 150 can include additional data such as the access times. Thus, unlike conventional locks, the cryptographic lock 130 can be used to log when the secure container 100 was opened. A user can then view the log via the RFID transceiver 150 to determine tampering.

The RFID transponder 138 and the RFID transceiver 150 may communicate via Near-Field Communication (NFC) technology. NFC between the RFID transponder 138 and the RFID transceiver is enabled by bringing the two NFC compatible devices, the RFID transponder 138 and the RFID transceiver 150, close to one another, typically less than four centimeters apart. At the contact distance between the RFID transponder 138 and the RFID transceiver 150 (i.e., distance between the devices where NFC occurs), the amount of energy that may be captured or redirected by the RFID transponder 138 is or about 1.8 mA at 2 V. The SMAs 134, 136, can be sized to achieve the threshold temperature $A_s$ when the energy is received.

Figure 2:
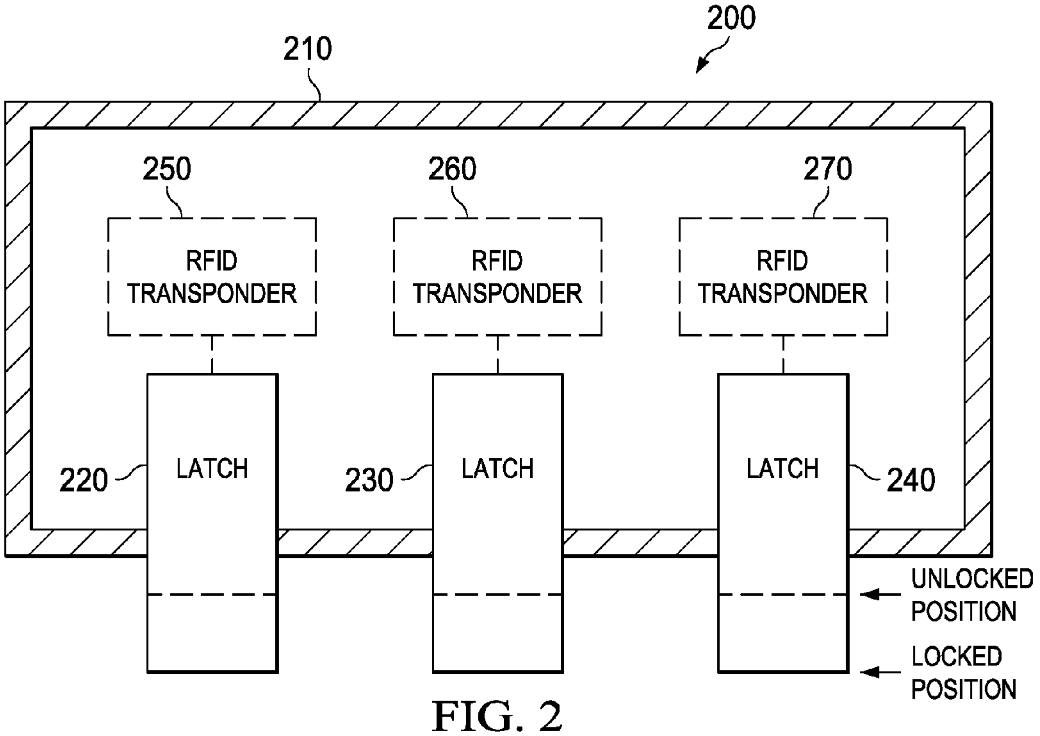
FIG. 2 is an illustration of a block diagram of an embodiment of a cryptographic lock constructed according to the principles of the present disclosure.

FIG. 2 illustrates a block diagram of an embodiment of a cryptographic lock 200 constructed according to the principles of the present disclosure. The cryptographic lock 200 includes a base 210 and multiple latches 220, 230 and 240. In FIG. 1, the cryptographic lock 130 is integrated with the lid 120. In FIG. 2, the cryptographic lock 200 is positioned on a base 210 that allows the cryptographic lock 200 to be added to a container, a cabinet, closet, door, etc., after manufacturing thereof. A glue or mechanical fixture may be used to secure the base to the object to be secured. The size of the cryptographic lock 200 can vary depending on the intended use. The cryptographic lock 200 can be positioned out of view to provide security without providing an eyesore. In some embodiments, the cryptographic lock 200 may be used as an actuator to operate a larger bolt to inhibit access.

At least one of the latches 220, 230, 240, may be a SMA that is sufficiently energized by an RF frequency to create current through each of the latches 220, 230, 240, to change each latch from a locked position (e.g., Martensite phase) to an unlocked position (e.g., Austenite phase). In another embodiment, at least one of the latches 220, 230, 240, may be a solenoid that operates at an RF frequency to convert the RF energy to linear motion that moves the solenoid core from a locked position to an unlocked position. In some embodiments, each latch 220, 230, 240, may be tuned to be energized by the same RF frequency. In other embodiments, each latch 220, 230, 240, may be energized by a different RF frequency. In such an embodiment, an RF transceiver (or RF transceivers) capable of transmitting multiple RF frequencies is needed to allow a user to open the cryptographic lock 200.

As illustrated in FIG. 2, the cryptographic lock 200 may include RFID transponders 250, 260, 270. The RFID transponders 250, 260, 270, can be used to provide current to each of the latches 220, 230, 240, respectively. The RFID transponders 250, 260, 270, may operate as the RFID transponder 138 previous discussed with respect to FIG. 1. Each RFID transponder 250, 260, 270, may operate at a different frequency. Alternatively, the same RF frequency may be used for each of the transponders 250, 260, 270.

Figure 3:
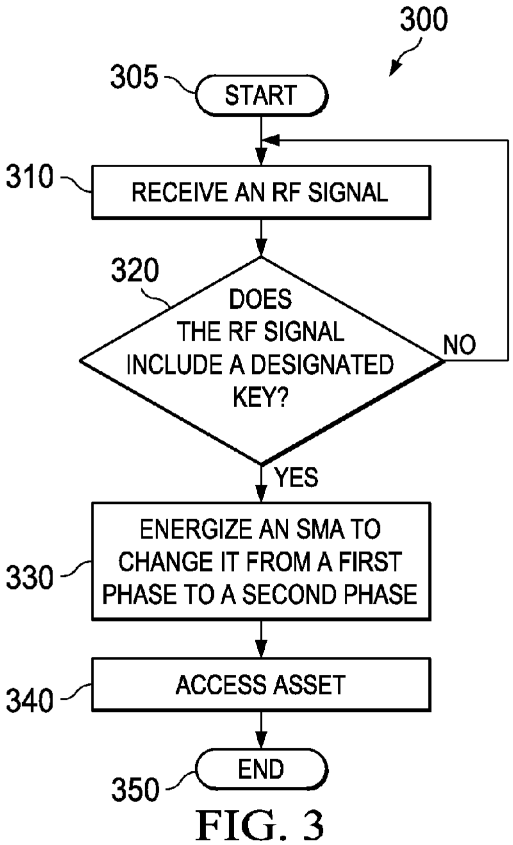
FIG. 3 is an illustration of a flow diagram of an embodiment of a method of operating a cryptographic lock carried out according to the principles of the present disclosure.

FIG. 3 illustrates a flow diagram of an embodiment of a method 300 of operating a cryptographic lock carried out according to the principles of the present disclosure. The cryptographic lock may include at least one SMA component and an RFID transponder. The method 300 begins with an intent to operate the cryptographic lock in a step 305.

The method 300 continues in a step 310 by receiving an RF signal. The RF signal may be received from a mobile telephone having an RFID transceiver. The RF signal may be transmitted by the mobile telephone employing NFC technology. In one embodiment, a Bluetooth™ compliant transmission may be used to communicate the signal.

After receiving the RF signal, a determination is made if the RF signal includes a designated key in a decisional step 320. If the RF signal includes the designated key, the SMA component is energized sufficiently to change the SMA from a first phase to a second phase in a step 330. The SMA can be coupled to the RF transponder such that the SMA is sufficiently energized during normal operation of the RF transponder. By being sufficiently energized, the SMA receives enough energy to transform the SMA from the first phase (e.g., Martensite) to the second phase (e.g., Austenite). The first phase prevents access to an asset and the second phase allows access to the asset.

After the SMA is transformed from the first phase to the second phase, the asset protected by the cryptographic lock can now be accessed in a step 340. Transformation between phases allows the SMA to go from a locked position to an unlocked position. As such, a lid can be removed to allow access to a secured product. Alternatively, a door can now be opened to allow access. After obtaining access, the RF signal with the designated key may be needed to re-secure the access. In other words, after a particular amount of time, depending on the SMA, the SMA will transform back to the first phase from the second phase. As such, the SMA will need to be energized to replace the lid or close the door to again secure the asset. The method then ends in a step 350.

Returning now to decisional step 320, if the RF signal does not include the designated key, then the method 300 returns to step 310 and continues. The method 300 may repeat if there are multiple SMAs used to inhibit access to property with each SMA operating at a different RF frequency.

The disclosure provides a micromechanical locking mechanism that uses an RFID tag (including passive or active high- or ultrahigh-frequency, HF or UHF) which requires an authentication protocol to be passed before energizing a latch, such as an SMA. The current traversing the SMA wire from the RFID tag elevates the temperature of the SMA causing it to change phases. The change from one phase to the other phase results in a change of shape of the SMA that unlocks the lock and enables access to an asset for a brief period of time after the source of energy (i.e., the RF signal with the authentication protocol) is removed.

The disclosed cryptographic lock can be embodied with no other mechanical parts and can be manufactured to function in small spaces. The lock may take the form of a completely passive system using the field energy from the RF signal to power the SMA.

The disclosed cryptographic lock also allows the RF transceiver and the RF transponder to maintain a log of each entry. The owner of the lock can query the lock to ensure there were no unauthorized entries. Additionally, the owner can view the RF transceiver, for example a cell telephone, to determine when the RF transceiver was used to open the lock. The disclosed cryptographic lock can then be used for medication monitoring and alerts since the RF transceiver would be needed to scan the medication container to obtain access.

With the cryptographic lock integrated in the lid or body of a container, the lock can also be used to ensure no tampering with the substance occurred throughout the supply chain. Additionally, the lock can ensure the substance within the container is the same substance that the manufacturer put inside. Thus, the lock can also protect against counterfeit pharmaceuticals or controlled substances being injected into a supply chain by, for example, preventing a vial or container from being opened without proper authentication.

Those skilled in the art to which the invention relates will appreciate that other and further additions, deletions, substitutions and modifications may be made to the described embodiments without departing from the scope of the invention.

What is claimed is:

1. A cryptographic lock for securing an asset, comprising:

a shape memory alloy (SMA) having a first and second phase, said first phase inhibiting access to an asset and said second phase allowing access to said asset;

wherein said first phase is a Martensite phase of said SMA and said second phase is an Austenite phase of said SMA; and an RFID transponder, coupled to said SMA, configured to receive an authentication signal from an RFID transceiver and, based thereon, energize said SMA to temporarily change said SMA from said first phase to said second phase, wherein said cryptographic lock secures said asset within a cavity of a body of a secure container, said secure container further having a lid secured by said cryptographic lock through employment of said first phase, wherein said RFID transponder is a Near Field Communication (NFC) transponder, wherein said RFID provides current to the SMAs to energize the SMA the through the heat generated by the current provided to the SMA, transform the SMA , from the Martensite phase and to the Austenite phase, wherein said RFID transponder generates about 1.8 mA at about 2 volts for said SMA upon receipt of said authentication signal, and wherein said 1.8 mA at about 2 volts has been captured or redirected by the RFID transponder to transform the SMA.

2. The cryptographic lock as recited in claim 1 wherein said SMA is a first SMA, said cryptographic lock further comprising a second SMA having a first and second phase, said first phase inhibiting access to said asset and said second phase allowing access to said asset.

3. The cryptographic lock as recited in claim 2 wherein said RF transponder is coupled to said second SMA and is configured to energize said second SMA based on receipt of said authorization signal to temporarily change said second SMA from said first phase to said second phase.

4. The cryptographic lock as recited in claim 2 wherein said RF transponder is a first RF transponder, said cryptographic lock further including a second RF transponder coupled to said second SMA and configured to energize said second SMA based on receipt of another authorization signal to temporarily change said second SMA from said first phase to said second phase.

5. A method of operating a cryptographic lock having at least one shape memory alloy (SMA), comprising:

receiving a first RF signal;

determining said first RF signal includes a first designated key; and energizing, if said first RF signal includes said first designated key, a first SMA to change said first SMA from a first phase to a second phase, said first phase inhibiting access to an asset and said second phase allowing access to said asset, wherein said first phase is a Martensite phase of said SMA and said second phase is an Austenite phase of said SMA; and wherein said cryptographic lock secures said asset within a cavity of a body of a secure container, said secure container further having a lid secured by said cryptographic lock through employment of said first phase, wherein said RF signal is a Near-Field Communication (NFC) signal received by an RFID transponder, and wherein said RFID provides current to the SMAs to energize each SMA the through the heat generated by the current provided to the SMA, transform the SMA, from the Martensite phase and to the Austenite phase, wherein said RFID transponder generates about 1.8 mA at about 2 volts for said SMA upon receipt of said authentication signal, and wherein said 1.8 mA at about 2 volts has been captured or redirected by the RFID transponder.

6. The method as recited in claim 5 wherein said energizing includes generating current to traverse said SMA and cause said SMA to transform from said Martensite phase to said Austenite phase.

7. The method as recited in claim 5 further comprising receiving a second RF signal, determining said second RF signal includes a second designated key and energizing, if said second RF signal includes said second designated key, a second SMA to change said second SMA from a first phase to a second phase, said first phase inhibiting access to said asset and said second phase allowing access to said asset, wherein said second RF signal, designated key and SMA differ from said first RF signal, designated key and SMA.

8. The method as recited in claim 5 wherein said energizing includes energizing a second SMA to change said second SMA from a first phase to a second phase, said first phase inhibiting access to an asset and said second phase allowing access to said asset.

9. A secure container, comprising:

a body having a cavity;

a lid configured to engage said body and cover at least a portion of said cavity; and a cryptographic lock associated with one of said body and said lid, said cryptographic lock including:

a shape memory alloy (SMA) capable of assuming an Austenite phase and a Martensite phase, one of said Austenite phase and said Martensite phase being a first phase and another of said Austenite phase and said Martensite phase being a second phase, said first phase inhibiting said lid from uncovering said cavity, said second phase allowing said lid to be displaced to uncover said cavity, and an RFID transponder, coupled to said SMA, configured to receive an authentication signal from an RFID transceiver and, based thereon, energize said SMA and thereby temporarily cause said SMA to change from said first phase to said second phase.

wherein said cryptographic lock secures an asset within said cavity of said secure container through employment of said lid, said lid secured by said cryptographic lock through employment of said first phase, wherein said RFID transponder is a Near Field Communication (NFC) transponder, wherein said RFID provides current to the SMAs to energize each SMA the through the heat generated by the current provided to the SMA , transform the SMA , from the Martensite phase and to the Austenite phase, wherein said RFID transponder generates about 1.8 mA at about 2 volts for said SMA upon receipt of said authentication signal, and wherein said 1.8 mA at about 2 volts has been captured or redirected by the RFID transponder.

10. The secure container as recited in claim 9 wherein said SMA is a first SMA, said cryptographic lock further comprising a second SMA having a first and second phase, said first phase inhibiting access to said asset and said second phase allowing access to said asset.

11. The secure container as recited in claim 10 wherein said RF transponder is coupled to said second SMA and is configured to energize said second SMA based on receipt of said authorization signal to temporarily change said second SMA from said first phase to said second phase.

12. The secure container as recited in claim 10 wherein said RF transponder is a first RF transponder, said cryptographic lock further including a second RF transponder coupled to said second SMA and configured to energize said second SMA based on receipt of another authorization signal to temporarily change said second SMA from said first phase to said second phase.

13. A cryptographic lock for securing an asset, comprising:

a shape memory alloy (SMA) having a first and second phase, wherein said first phase is a Martensite phase of said SMA and said second phase is an Austenite phase of said SMA; and an RFID transponder, coupled to said SMA, configured to receive an authentication signal from an RFID transceiver and, based thereon, energize said SMA to temporarily change said SMA from said first phase to said second phase, wherein said cryptographic lock secures said asset within a cavity of a body of a secure container, said secure container further having a lid secured by said cryptographic lock through employment of said first phase;

said SMA configured as a first latch configured to inhibit access to an asset when in a locked position and allow access to said asset when in an unlocked position, wherein said first latch is configured to temporarily change from said locked position to said unlocked position in response to receipt of an RF signal at a first frequency, the cryptographic lock further comprising an RF transponder coupled to said first latch and configured to receive said RF signal and energize said first latch to cause said first latch to move from said locked position to said unlocked position, wherein said RF transponder is an RFID transponder, and wherein said RFID transponder is a Near Field Communication (NFC) transponder, and wherein said RFID provides current to the SMAs to energize each SMA the through the heat generated by the current provided to the SMA, transform the SMA , from the Martensite phase and to the Austenite phase, wherein said RFID transponder generates about 1.8 mA at about 2 volts for said SMA upon receipt of said authentication signal, and wherein said 1.8 mA at about 2 volts has been captured or redirected by the RFID transponder.

14. The lock as recited in claim 13 further comprising a second latch configured to inhibit access to said asset when in a locked position and allow access to said asset when in an unlocked position, wherein said second latch is configured to temporarily change from said locked position to said unlocked position in response to receipt of an RF signal at a second frequency different from said first frequency.

15. The lock as recited in claim 13 wherein said first latch is a shape metal alloy.

16. The lock as recited in claim 13 wherein said first latch is a solenoid.

* * * * *